United States Patent Office 3,822,125
Patented July 2, 1974

3,822,125
FLASH SMELTING OF IRON ORE AND CONCENTRATE
Edward S. Roberts, Bayside, N.Y., assignor to Treadwell Corporation, New York, N.Y.
Filed Oct. 13, 1972, Ser. No. 297,503
Int. Cl. C21b *11/00*
U.S. Cl. 75—40
10 Claims

ABSTRACT OF THE DISCLOSURE

Iron ore of concentrates are direct flame smelted by introducing them with oxygen, hydrogen, slag forming constituents and heating fuel, which may be solid, such as coal, or hydrocarbonaceous fuels into a vertical shaft furnace. The reduction of the iron oxides produces molten iron and molten slag, the amount of fuel and oxygen being sufficient to maintain temperatures above the melting point of the iron and slag, for example about 1810° K. Molten iron and slag are tapped off continuously or intermittently, and the furnace gases, which contain carbon dioxide, carbon monoxide, water vapor and hydrogen, are then treated to produce additional hydrogen, using steam for quenching to prevent carbon monoxide disproportionation. The water gas reaction, which can be completed at lower temperatures in a catalytic converter, transforms substantially all of the carbon monoxide into carbon dioxide and hydrogen, and the carbon dioxide and water is separated off and the hydrogen recycled through the shaft furnace. Two variants are described, in one of which there are heat recuperators so that the recycled hydrogen is heated up, for example to around 1400° K., and a second variant where the recycled hydrogen is not reheated but is present in larger amounts than in the first variant. In this second variant heat from the hot furnace gases is used to produce power and/or generate steam in a waste heat boiler, which can also be used in the first variant. It is not essential that low sulfur fuel be used. If there is a considerable amount of sulfur, it can be substantially removed from the iron by blowing finely divided coal and lime through the molten iron, preferably in an electric furnace. At the same time the introduction of finely divided coal and silica can be used to add carbon and silicon to the molten iron.

BACKGROUND OF THE INVENTION

The standard method of iron smelting is in blast furnaces in which the iron oxide, with fluxes, such as limestone, and with the requisite amount of carbon, passes down through the furnace countercurrent to a blast of air. Several problems are presented. Carbon, in the form of coke, has to be in lump form as otherwise it is blown out of the blast furnace, thereby presenting a problem of dust loss and particulate emission. Coke can be produced only from certain coals, which are known as coking coals and which are considerably more expensive than non-coking coals. The cost may be further increased by transportation of the coke from a distance. The cost of the coking operation adds to the overall expense and presents increasingly serious problems of emissions.

For the same reason that coke has to be used in lump form, the iron bearing raw material has to be in lump form. If it is finely divided, it is blown out of the blast furnace. This has raised a number of practical problems, particularly with iron oxide concentrates from lower grade ores, such as taconite, which are becoming increasingly important sources of iron ore in many parts of the United States. These concentrates, for example concentrates from magnetic taconites, contain relatively fine particles because it is necessary to employ fine grinding to liberate the iron oxide values. Such finely particulate material is completely unsuitable for blast furnace use, and so it has been necessary to agglomerate the finely divided iron oxide material into sintered pellets or briquets. The cost of the pelletizing or briquetting, while not in any sense prohibitive, nevertheless, is substantial and reduces the economic value of the low grade iron ores.

Certain proposals for direct smelting of finely divided iron oxide have been made in which the iron oxide is suspended in a reducing flame. As early as 1874, in the Wheeler U.S. Pat. 156,244, such a process is described. Later developments, such as Pats. 2,750,276 and 2,750,-277, have indicated that a hydrogen rich gas is desirable in the flame reduction, something that was not realized in the old Wheeler patent. The patents describe producing such a gas by the thermal cracking of liquid or gaseous carbonaceous fuels.

It has also ben suggested that in order to maintain the high temperatures required in reduction of iron oxide, oxygen or enriched air is desirable. Examples of such descriptions are to be found in the Kapeteyn Pat. 1,490,-012, the Steele Pat. 1,515,916, and in patents to Rees, 2,702,240 and to Whaley, 2,977,216. In these last two patents steam is used in the flame.

When carbonaceous fuels are used as a source of heat and reduction, the carbon monoxide which is in the off gas from the furnace tends to disproportionate as the gas is cooled, forming $CO_2$ and carbon. This gravely limits the possibility of utilizing the sensible heat of the furnace gases in boilers or recuperators owing to the deposition of carbon on the heat exchange surfaces. Moreover the carbon represents a significant loss of fuel energy whether it is deposited by disproportionation of carbon monoxide in the off gases or formed, as in Pats. 2,750,276 and 2,750,-277, by the thermal cracking of the fuel. As a result of the problems referred to above, hitherto the direct flame smelting of iron ore has not achieved any widespread use, and processes using the old style blast furnaces are still the major ones for iron ore reduction.

SUMMARY OF THE INVENTION

The present invention reduces iron oxide ores or concentrates in a direct flame under conditions where the drawbacks referred to in the preceding section of the specification are not encountered. For simplicity, in the remaining portion of the specification the iron oxide will be referred to as $Fe_2O_3$, although it should be realized that in the case of beneficiated iron concentrates from magnetic taconite, the iron oxide is largely or wholly in the form of magnetite. In the present invention it does not make any difference whether the iron oxide is magnetite, hematite or other iron oxide. Of course the ideal proportions of the reactants varies somewhat with the chemical constitution of the particular iron oxide used as a raw material in the process. The proportions are so determined as to reduce the equilibrium partial pressure of oxygen in the furnace to below that at which a separate phase liquid FeO will form, namely below about $5 \times 10^{-5}$ atm. If the equilibrium partial pressure of oxygen is such that a separate phase of liquid FeO forms, problems are presented by the fact that the liquid FeO in a separate phase tends to corrode refractories, such as refractory brick lining of equipment. When there is no separate phase of liquid FeO, corrosion is so much reduced that it does not present a significant operating problem.

Essentially the present invention involves a combination of a number of factors, all of which must be present to permit the improved process to proceed. One of the essential features is that, as in U.S. Pats. 2,750,276–7, there must be a large amount of gaseous hydrogen in the flame, in fact a very substantial excess, so that the off gases contain the excess hydrogen. This hydrogen content may be increased by recycling of the hydrogen, either that present in the off gases of the furnace or to an even larger extent that produced from the carbon monoxide of the off gases by the water gas process. A second essential element of the present invention is that the actual smelting be effected with a flame using commercial oxygen or at least extensively oxygen enriched air as the source of oxygen for the generation of heat which is needed in the flame smelting. Any $N_2$ introduced into the circuit must obviously be bled from it.

Fuel is not critical. It may be finely divided carbonaceous material, preferably hydrocarbonaceous material, such as coal. Metallurgical coke is not required, though, of course, in finely divided form this can be used where cheap coke fines are available and is, therefore, not excluded. The fuel may be finely divided solids; liquid, such as oil; gases, such as cracked fuel gases, and the like. Fluxes, which are introduced with the iron oxide, fuel and oxygen into the shaft furnace, may be of any composition suitable for the gangue, for example silica, lime, etc. As in all iron reduction processes, there must be sufficient flux to produce the desired slag, but the particular slagging constituents are not what distinguishes the present invention from the prior art, it being an advantage that any suitable flux may be used.

A very important advantage of the present invention is that the iron ore or iron oxide need not be in relatively large lumps; in fact it should be sufficiently finely divided to take advantage of the very rapid smelting made possible in a flame. This means that finely divided iron oxide concentrates, such as from low grade iron ores, such as taconites, may be used without the additional expense of sintering or pelletizing.

Another very important element of the combination process of the present invention is that the off gases from the furnace are quenched with steam, sufficient steam being present to prevent disproportionation of carbon monoxide as the gases cool and to produce more hydrogen and carbon dioxide by the water gas process. A very extensive transformation of carbon monoxide into carbon dioxide and hydrogen takes place and can be completed, if desired, in suitable catalytic converters. Since these are conventional pieces of apparatus, for example of the type used in producing hydrogen for ammonia synthesis, and are well known, they will not be specifically described in the more detailed description of the present invention. This portion of the invention will be described in diagrammatic flow sheet form. It is an advantage of the present invention that standard pieces of equipment may be used.

When the variant in which the recirculated hydrogen is heated up is used, it is necessary to use fairly high temperature heat exchanges, which may be of various types. Stove types with checkerwork brick and the like, may be used. The particular design of heat exchanger is not what distinguishes the present invention from the prior art, and so in the more specific description of preferred embodiments one form will be shown purely diagrammatically.

When high sulfur fuels are used, very little of the sulfur is removed in the slag, but a considerable amount may be removed as $H_2S$ in the off gases. The rest of the sulfur in the main dissolves in the molten iron produced. This product, after separating the off gases, can be treated to remove sulfur by blowing finely divided carbon and lime through the molten iron, for example in an electric furnace. Under the reducing conditions that would obtain here a major portion of the sulfur combines with lime and is rejected in a slag. The operation just described, which is an additional, more specific variant of the present invention, not only removes excess sulfur over that which is tolerable in the final iron but by adding extra carbon and/or carbon plus silica, desired carbon and/or silicon can be added to the molten iron. The operation, of course, results in off gases containing carbon monoxide which can be recycled into the off gases from the main smelting operation and can then be converted to hydrogen and recycled to the main smelting operation.

The off gases from the furnace will contain some fine droplets of iron and slag. It is necessary to drop the temperature of these off gases below the freezing point of these materials by quenching with steam to prevent these materials from freezing on the cooler surfaces in later processing in heat recovery equipment. Removal from the off gases of small amounts of particulate solids resulting from the quench presents no problem as it can be effected in cyclones, sand filters and the like. However, it is desirable to remove particulate matter after quenching with steam, though the invention is not limited thereto.

DESCRIPTION OF THE PREFERRED EMBODIMENTS

Figure 1:
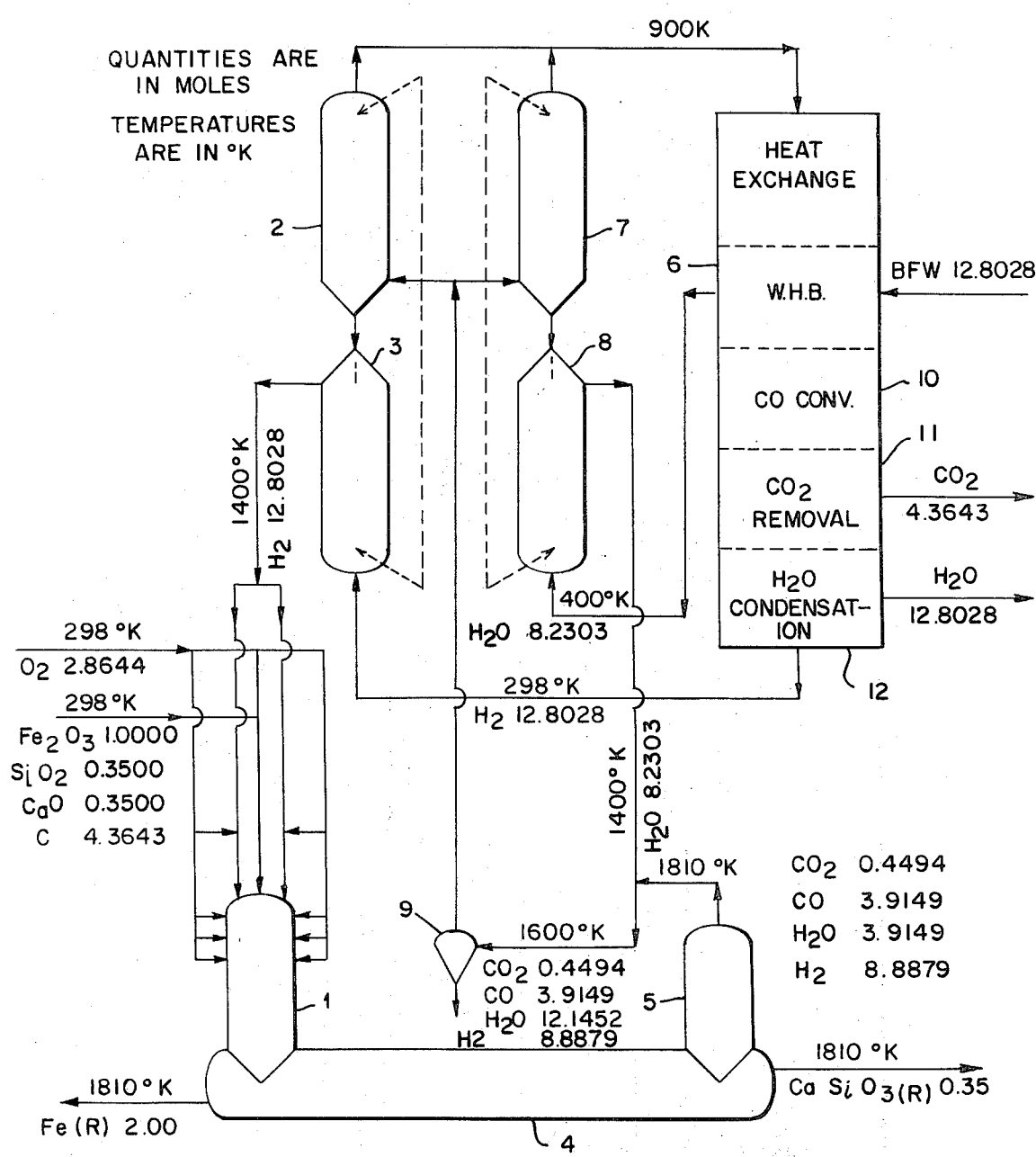
FIG. 1 is a semi-diagrammatic flow sheet of the process and apparatus of the present invention using recuperation of heat in recirculating hydrogen.
Figure 2:
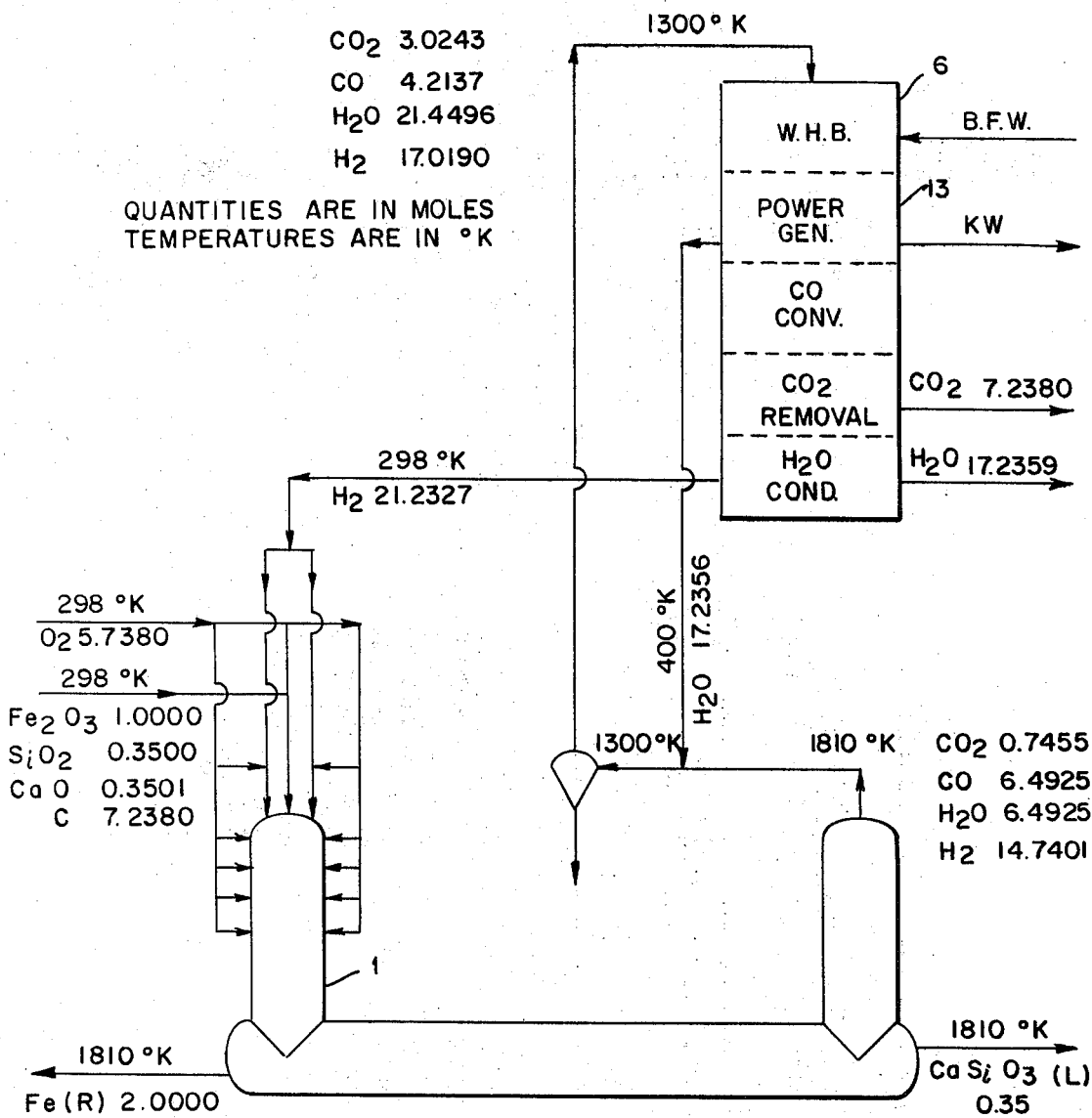
FIG. 2 is a similar diagrammatic flow sheet in which reheating of the recirculated hydrogen is omitted.

The shaft furnace is shown at (1) and is the same in both variants according to FIGS. 1 and 2. Into this shaft there is fed oxygen and a solid charge of iron oxide, silica, lime and a carbonaceous fuel, which on the drawing of FIG. 1 is shown as carbon though in practice it will usually be coal, which contains hydrogen also, because coal is cheaper than coke. Into the shaft furnace there is recirculated hydrogen which has been reheated to 1400° K. by the recuperators (2) and (3). Amounts of the different materials are shown on FIG. 1, the iron oxide being represented as $Fe_2O_3$, although, as has been pointed out above, this may be a different iron oxide, for example magnetite, where the source is from magnetic taconite. The iron oxide is present in fairly finely divided particles, and the silica, lime and, if a solid fuel is used, the coal or coke are also reduced to a sufficiently small size to give a good flame. The relative amounts of the different materials are not critical, but on the drawings are shown as that required for the reaction to take place.

The molten iron and slag flows into a horizontal section of the furnace (4); iron and molten slag are at a temperature of approximately 1810° K. As the slag is considerably lighter than the molten iron, it is tapped off at a higher level, as can be seen.

The off gases of the furnace pass up through a shaft or conduit (5) and encounter hot steam at about 1400° K. This steam, which can be generated in a waste heat boiler (6), is heated up in another set of recuperators (7) and (8). The recuperators, although shown diagrammatically, are of the circulating solids type, such as, for example, recuperators which have been described above, pebble heaters, and the like. The return of cooled solids of the lower sections (3) and (8) of the recuperator are elevated to the top of the upper sections (2) and (7), respectively. This is shown on the drawing in dashed lines, and the elevators are, of course, of conventional design. The steam generated by the waste heat boiler is at approximately 400° K., the waste heat boiler receiving off gases after quenching at about 900° K. from the upper sections (2) and (7) of the recuperators where these gases have given up their heat.

The quenched off gases, now at a temperature of about 1600° K., are passed through a particulate remover (9), which is diagrammatically shown as a cyclone. After solid particles are removed, the hot gases then enter the heating portions (2) and (7) of the recuperators.

The cooled gases leaving the waste heat boiler have most of the carbon monoxide transformed into carbon dioxide as in the presence of the steam the water gas shift reaction proceeds rapidly between 1600° K. and 900° K. Any residual carbon monoxide which may still be present is then transformed into carbon dioxide and hydrogen in a conventional catalytic converter (10). The carbon dioxide is removed by conventional means, such as by scrubbing with a carbonate, such as potassium carbonate, in the portion of the drawing shown at (11). Temperature then is allowed to drop, and water is condensed out in the section (12). The arrows indicate outflow of water and carbon dioxide, the former being returned to the waste heat boiler as boiler feed water, whereas the carbon dioxide can be vented to the atmosphere or utilized in any conventional manner.

FIG. 2 illustrates a modified operation with the recuperators for heating up steam and recycled hydrogen eliminated. The other portions of the apparatus carry the same reference numerals as in FIG. 1 as they are performing the same function. It will be noted that the amounts of materials are somewhat changed. In FIG. 1, 12.8028 moles of hydrogen at high temperatures, 1400° K., are introduced into the shaft with 2.8644 moles of oxygen and 4.3643 moles of carbon in the fuel. When there is no recuperation of heat, as in FIG. 2, the amount of hydrogen and steam is increased as well as oxygen and carbon because the heating which the recuperation provides must be supplied by additional reactants. Of course the composition of the off gases also varies. For convenience, both FIGS. 1 and 2 are based on the same amount of iron oxide, silica and lime.

The steam for quenching is introduced into the off gases at a lower temperature, 400° K., and these gases are quenched to 1300° K. instead of 1600° K. of FIG. 1. These 1300° gases are introduced directly into the waste heat boiler (6) and result in the generation of a considerably larger amount of steam at a higher temperature and pressure. This passes through a power generator (13), which may be a steam turbine, and the 400° K. quenching steam is from the turbine low pressure section. The turbine produces power, which is shown on the drawing and labelled (KW).

It will be seen that while there is considerably higher consumption of fuel in the modification of FIG. 2, this does not represent necessarily a loss because now the waste heat boiler generates steam from which power can be taken instead of merely furnishing the steam for quenching. The fuel is economically used, but the additional amount of oxygen because of the lower temperature of the larger amount of recycled hydrogen represents a certain decreased economy over FIG. 1 because, as far as power generation is concerned, fuel can be burned with air instead of with oxygen. On the other hand, the cost of recuperators and their operation is eliminated. Either FIG. 1 or FIG. 2 represents a very efficient system. Where oxygen is available cheaply, for example as a by-product from ammonia or calcium cyanamid plants, the savings in recuperator costs and recuperator operation may make the modification of FIG. 2 economically more attractive. On the other hand, where oxygen costs and/or fuel costs are higher, the overall economy of the system with recuperators shown in FIG. 1 may represent a more desirable compromise. It will be noted that the larger amount of hydrogen introduced into the shaft furnace (1) and coming out in the off gases does not represent a loss. This is a circulating load and its sensible heat is recovered by the waste heat boiler, and a portion of it is utilized as power.

The proportions of hydrogen fuel and oxygen shown on the drawings produce a partial pressure of oxygen sufficiently low so that a separate phase of molten FeO does not form. Accordingly the high corrosive effect on refractory linings does not result.

The amounts of materials and components used in both figures are shown in terms of an iron ore $Fe_2O_3$. Proportions will be somewhat different if the iron ore is magnetite, but for simplicity $Fe_2O_3$ is used as a base for the two figures.

Reference has been made above to the fact that the fuel need not be coke and need not even be low sulfur coal. Any sulfur introduced will normally pass out with the slag in the form of calcium sulfide which is produced in a second operation by blowing finely divided carbon and lime through the molten iron in an electric furnance. The carbon and lime reacts with most of the sulfur to produce calcium sulfide and carbon monoxide. At the same time carbon may be added to the molten iron and $SiO_2$ reduced with carbon to add silicon to the molten iron while the carbon is oxidized to carbon monoxide.

I claim:
1. A process of direct reduction of iron oxide to molten iron comprising, in combination,
   a. introducing particulate iron oxide, carbonaceous fuel, an excess of hydrogen, and oxygen of at least commercial purity into a furnace together with slag forming components, whereby a flame is produced, the iron oxide is reduced to molten iron, maintaining an oxygen partial pressure in the furnace below about $5 \times 10^{-5}$ atmospheres, whereby molten FeO is not produced as a separate phase,
   b. separating molten iron and molten slag from off gases containing carbon dioxide, carbon monoxide, steam hydrogen and entrained solids, and quenching the off gases with steam to a temperature at which entrained solids can be separated, and separating said solids, whereby the presence of the steam prevents disproportionation of carbon monoxide to carbon and carbon dioxide,
   c. converting carbon monoxide in the off gases after quenching and cleaning to $CO_2$ and $H_2$ by water gas shift conversion,
   d. removing carbon dioxide and water, and
   e. recycling hydrogen to step (a).

2. A process according to Claim 1 in which the temperature of the reation zone is at least 1700° K.

3. A process according to Claim 1 in which the carbonaceous fuel is coal.

4. A process according to Claim 1 in which the recycled hydrogen is preheated by heat exchange with the quenched off gases, whereby a portion of the sensible heat of the off gases is recovered by heating up the recycled hydrogen.

5. A process according to Claim 1 in which the quench steam is superheated by heat exchange with the off gases.

6. A process according to claim 1 in which the carbonaceous fuel is high in sulfur and the sulfur dissolves in the molten iron and after separating the molen iron from the first slag it is maintained molten and finely divided carbonaceous fuel, alkaline earth metal oxides and silica are blown through the molten iron with a stream of hot hydrogen, the amount of carbonaceous fuel being sufficient to produce a carbon content of the iron approximating that of pig iron and the alkaline earth metal oxides and silica being sufficient to form alkaline earth metal sulfide with most of the sulfur dissolved in the molten iron, and finally separating the slag thus produced from the molten iron.

7. A process according to claim 6 in which the carbonaceous fuel divided coal and the alkaline earth metal oxide is predominantly calcium oxide.

8. A process according to Claim 6 in which the recycled hydrogen is preheated by heat exchange with the quenched off gases, whereby a portion of the sensible heat of the off gases is recovered by heating up the recycled hydrogen.

9. A process according to Claim 7 in which the recycled hydrogen is preheated by heat exchange with the quenched off gases, whereby a portion of the sensible heat of the off gases is recovered by heating up the recycled hydrogen.

10. A process according to Claim 6 in which the quench steam is superheated by heat exchange with off gases.

References Cited

UNITED STATES PATENTS

| | | | |
|---|---|---|---|
| 3,179,513 | 4/1965 | Toulmin Jr. | 75—42 |
| 2,865,732 | 12/1958 | Jensen | 75—11 |
| 2,821,471 | 1/1958 | Sellers | 75—34 X |
| 1,690,916 | 11/1928 | Westberg | 75—91 |
| 1,638,684 | 8/1927 | Edwin | 75—91 |
| 1,490,012 | 4/1924 | Kapteyn Jr. | 75—40 |
| 1,715,155 | 5/1969 | Westberg | 75—40 |
| 2,413,434 | 12/1946 | Cottrell | 75—40 |
| 2,951,756 | 9/1960 | Cavanagh | 75—40 |

FOREIGN PATENTS

| | | | |
|---|---|---|---|
| 1,067,661 | 8/1967 | Great Britain | 75—51 |

L. DEWAYNE RUTLEDGE, Primary Examiner

M. J. ANDREWS, Assistant Examiner

U.S. Cl. X.R.

75—48, 51